(12) United States Patent
Lin et al.

(10) Patent No.: US 10,642,357 B2
(45) Date of Patent: May 5, 2020

(54) HAND GESTURE SENSING SYSTEM USING BIONIC TENDONS

(71) Applicant: ACER INCORPORATED, New Taipei (TW)

(72) Inventors: Jia-Yu Lin, New Taipei (TW); Chih-Chiang Chen, New Taipei (TW); Jin-Ting Kuo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/191,468

(22) Filed: Nov. 15, 2018

(65) Prior Publication Data

US 2020/0026351 A1 Jan. 23, 2020

(30) Foreign Application Priority Data

Jul. 19, 2018 (TW) .............................. 107124918 A

(51) Int. Cl.
*G06F 3/01* (2006.01)
*G06F 3/03* (2006.01)

(52) U.S. Cl.
CPC .............. *G06F 3/014* (2013.01); *G06F 3/017* (2013.01); *G06F 3/0321* (2013.01)

(58) Field of Classification Search
None
See application file for complete search history.

(56) References Cited

U.S. PATENT DOCUMENTS

| | | | | |
|---|---|---|---|---|
| 4,542,291 | A | * 9/1985 | Zimmerman | ...... G01D 5/35345 250/231.1 |
| 5,676,157 | A | * 10/1997 | Kramer | .................. A61B 5/103 600/595 |
| 2002/0126026 | A1* | 9/2002 | Lee | ......................... G06F 3/014 341/22 |

FOREIGN PATENT DOCUMENTS

| | | |
|---|---|---|
| CN | 102915111 A | 2/2013 |
| CN | 105919772 A | 9/2016 |
| CN | 106933340 A | 7/2017 |
| CN | 107479698 A | 12/2017 |
| TW | 201101197 A1 | 1/2011 |

* cited by examiner

*Primary Examiner* — Christopher J Kohlman
(74) *Attorney, Agent, or Firm* — Winston Hsu

(57) ABSTRACT

A hand gesture sensing system includes a glove, five bionic tendons, five optical sensors, and a micro controller unit. The five bionic tendons are disposed in five sheaths of the glove, respectively. The five optical sensors are disposed in the glove and configured to detect the displacement or the deformation of the five bionic tendons, thereby identifying a hand gesture of a user when wearing the glove.

12 Claims, 10 Drawing Sheets

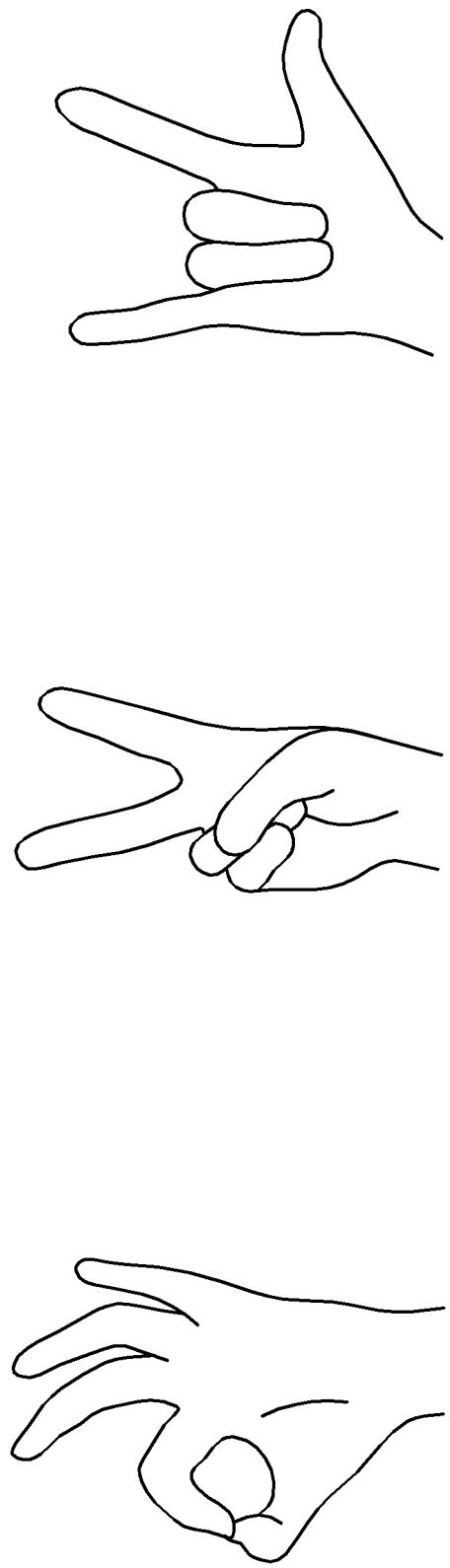

HAND GESTURE SENSING SYSTEM USING BIONIC TENDONS

CROSS REFERENCE TO RELATED APPLICATION

This application claims priority of Taiwan Application No. 107124918 filed on 2018 Jul. 19.

BACKGROUND OF THE INVENTION

1. Field of the Invention

The present invention provides a hand gesture sensing system, and more particularly, to a hand gesture sensing system using bionic tendon.

2. Description of the Prior Art

Virtual reality (VR) is an interactive computer-generated experience taking place within a simulated environment, that incorporates mainly auditory and visual, but also other types of sensory feedback like haptic. VR technologies provide a user wearing special display equipment with an immersive environment similar to the real world and allow the user to interact with a VR object or other users.

In addition to VR headsets, VR gloves are wearable VR gaming motion controller able to transform human's hand actions in digital inputs. Existing VR gloves mostly adopt optical fiber, mechanical or variable resistor detecting technique, and can thus be bulky and difficult to maneuver.

SUMMARY OF THE INVENTION

A hand gesture sensing system using bionic tendon includes a glove, first through fifth bionic tendons, first through fifth optical sensors, and a micro controller unit. The first glove includes a first sheath, a second sheath, a third sheath, a fourth sheath, and a fifth sheath. The first bionic tendon is disposed in the first sheath. The second bionic tendon is disposed in the second sheath. The third bionic tendon is disposed in the third sheath. The fourth bionic tendon is disposed in the fourth sheath. The fifth bionic tendon is disposed in the fifth sheath. The first optical sensor is disposed in the first glove and configured to detect a first displacement or a first deformation of the first bionic tendon. The second optical sensor is disposed in the first glove and configured to detect a second displacement or a second deformation of the second bionic tendon. The third optical sensor is disposed in the first glove and configured to detect a third displacement or a third deformation of the third bionic tendon. The fourth optical sensor is disposed in the first glove and configured to detect a fourth displacement or a fourth deformation of the fourth bionic tendon. The fifth optical sensor is disposed in the first glove and configured to detect a fifth displacement or a fifth deformation of the fifth bionic tendon. The micro controller unit is configured to identify a hand gesture of a user when wearing the glove according to the first through fifth displacement or according to the first through fifth deformation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3-5 are diagrams illustrating the displacement or deformation of bionic tendons in response to different hand gestures according to embodiments of the present invention.

DETAILED DESCRIPTION

Figure 1:
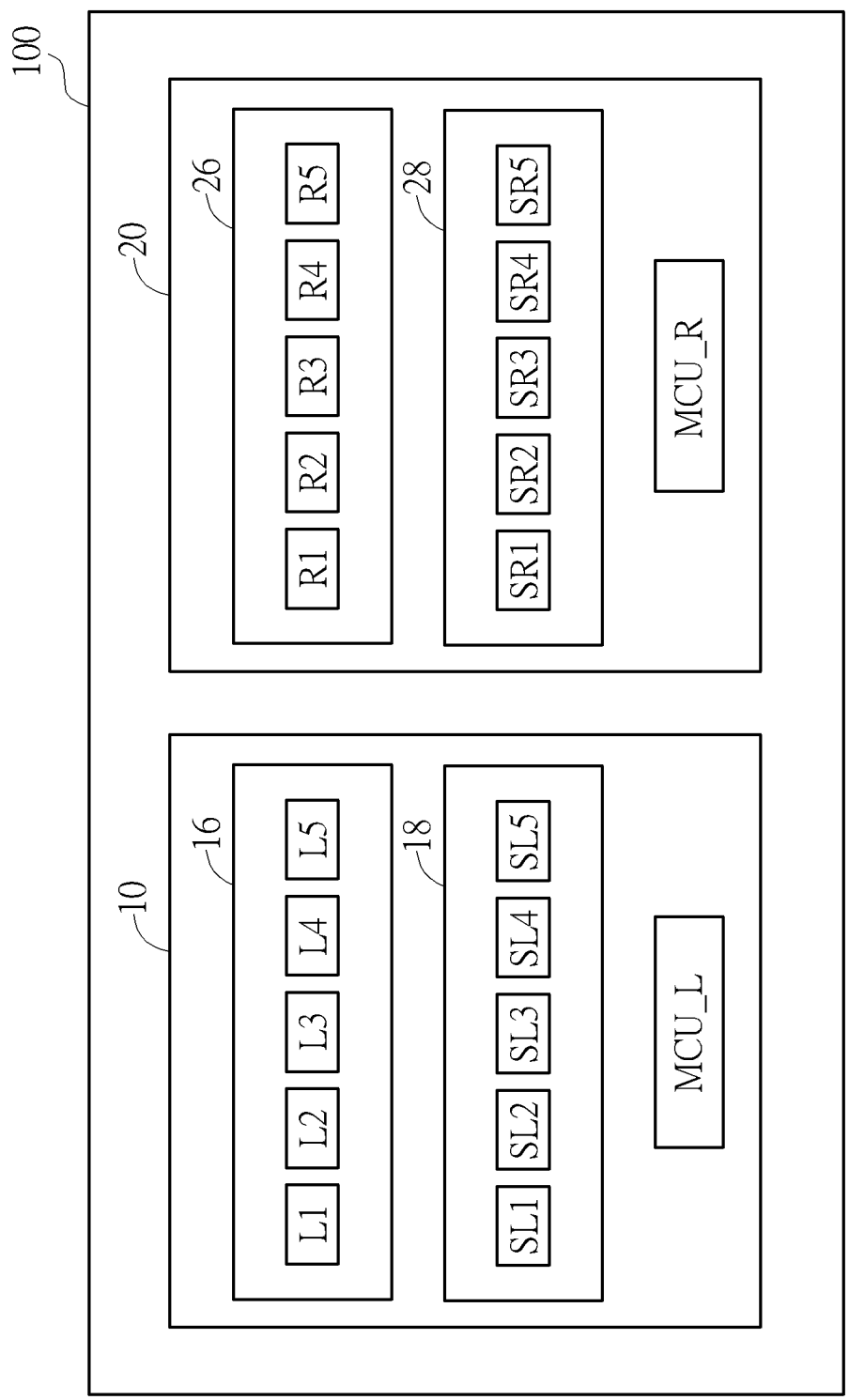
FIG. 1 is a function al diagram illustrating a hand gesture sensing system according to an embodiment of the present invention.

FIG. 1 is a function al diagram illustrating a hand gesture sensing system 100 according to an embodiment of the present invention. The hand gesture sensing system 100 includes a left-hand glove 10 and a right-hand glove 20. A left-hand detecting unit 16, a left-hand optical sensing unit 18, and a micro controller unit MCU_L are disposed in the left-hand glove 10. A right-hand detecting unit 26, a right-hand optical sensing unit 28, and a micro controller unit MCU_R are disposed in the right-hand glove 20. The left-hand detecting unit 16 includes five bionic tendons L1-L5, and the left-hand optical sensing unit 18 includes five optical sensors SL1-SL5. The right-hand detecting unit 26 includes five bionic tendons R1-R5, and the right-hand optical sensing unit 28 includes five optical sensors SR1-SR5.

The bionic tendons L1-L5 are disposed in the left-hand glove 10 at locations which correspond to left-hand fingers of a user. The bionic tendons R1-R5 are disposed in the right-hand glove 20 at locations which correspond to right-hand finger of the user. Therefore, when the user puts the left-hand glove 10 on his left hand and puts the right-hand glove 20 on his right hand, the movements of the left-hand fingers cause the bionic tendons L1-L5 to move or deform, while the movements of the right-hand fingers cause the bionic tendons R1-R5 to move or deform. The optical sensors SL1-SL5 are configured to detect the displacement or deformation of the bionic tendons L1-L5, respectively. The optical sensors SR1-SR5 are configured to detect the displacement or deformation of the bionic tendons R1-R5, respectively. The micro controller unit MCU_L is configured to identify a left-hand gesture of the user according to the displacement or deformation of the bionic tendons L1-L5. The micro controller unit MCU_R is configured to identify a right-hand gesture of the user according to the displacement or deformation of the bionic tendons R1-R5.

Figure 2:
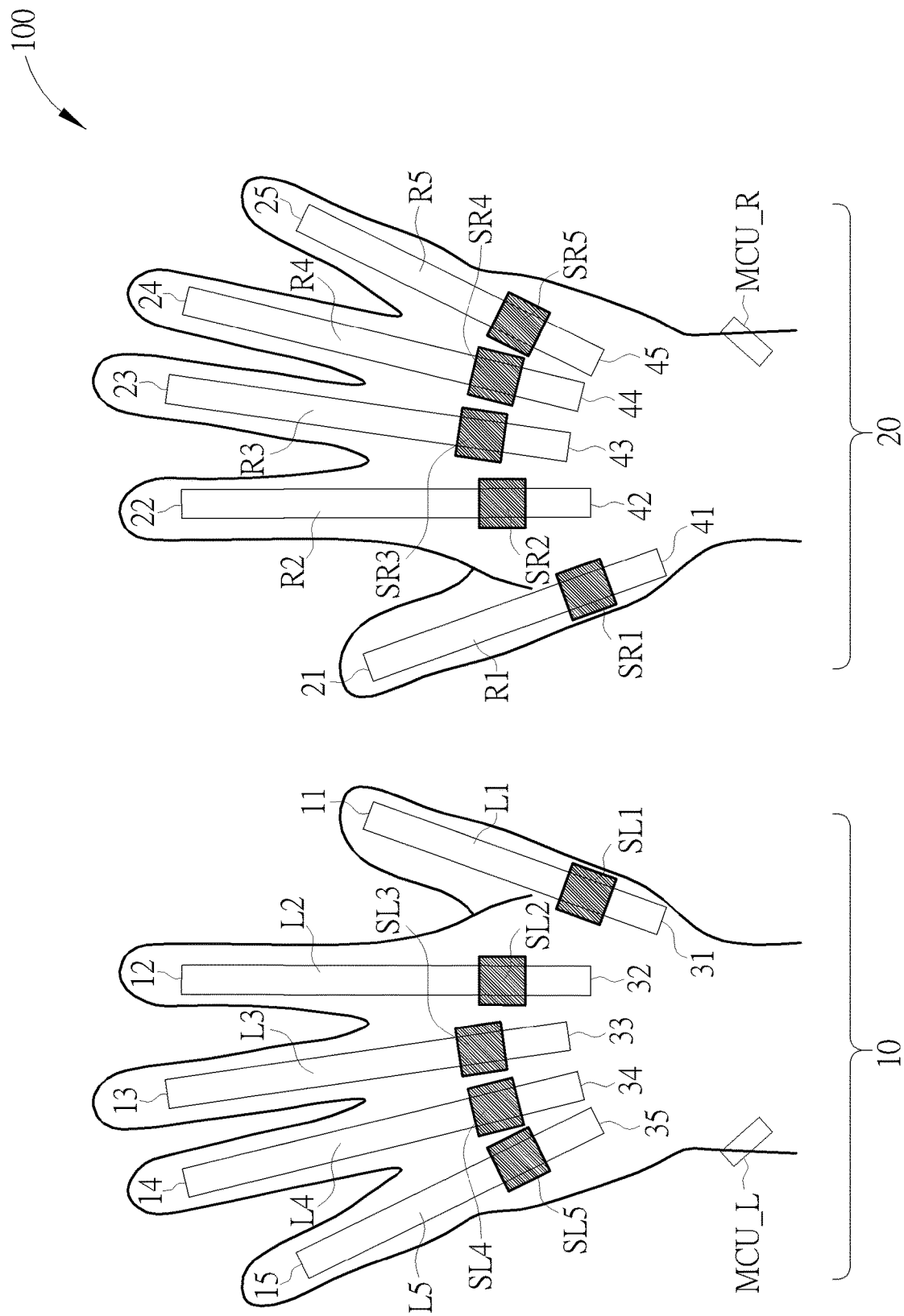
FIG. 2 is a diagram illustrating an implementation of a hand gesture sensing system according to an embodiment of the present invention.

FIG. 2 is a diagram illustrating an implementation of the hand gesture sensing system 100 according to an embodiment of the present invention. The bionic tendons L1-L5 are disposed in the sheaths of the left-hand glove 10 which accommodate the left-hand thumb, index finger, middle finger, ring finger and little finger of the user for monitoring the movements of the left-hand fingers. The first ends 11-15 of the bionic tendons L1-L5 are disposed at locations of the left-hand glove 10 which correspond to the left-hand fingertips of a user, and the second ends 31-35 of the bionic tendons L1-L5 are disposed at locations of the left-hand glove 10 which correspond to the back of the left hand of the user. The bionic tendons R1-R5 are disposed in the sheaths of the right-hand glove 20 which accommodate the right-hand thumb, index finger, middle finger, ring finger and little finger of the user for monitoring the movements of the right-hand fingers. The first ends 21-25 of the bionic tendons R1-R5 are disposed at locations of the right-hand glove 20 which correspond to the right-hand fingertips of the user, and the second ends 41-45 of the bionic tendons R1-R5 are disposed at locations of the right-hand glove 20 which correspond to the back of the right hand of the user.

FIGS. 3-5 are diagrams illustrating the displacement or deformation of the bionic tendons in response to different hand gestures according to embodiments of the present invention. The left-hand gesture of the user are depicted on the top side of FIGS. 3-5, while the displacement or deformation of the corresponding bionic tendons L1-L5 are depicted on bottom side of FIGS. 3-5. As depicted in FIGS. 3-5, the displacement or deformation of a bionic tendon increases with the bending angle of a corresponding finger.

Figure 6:
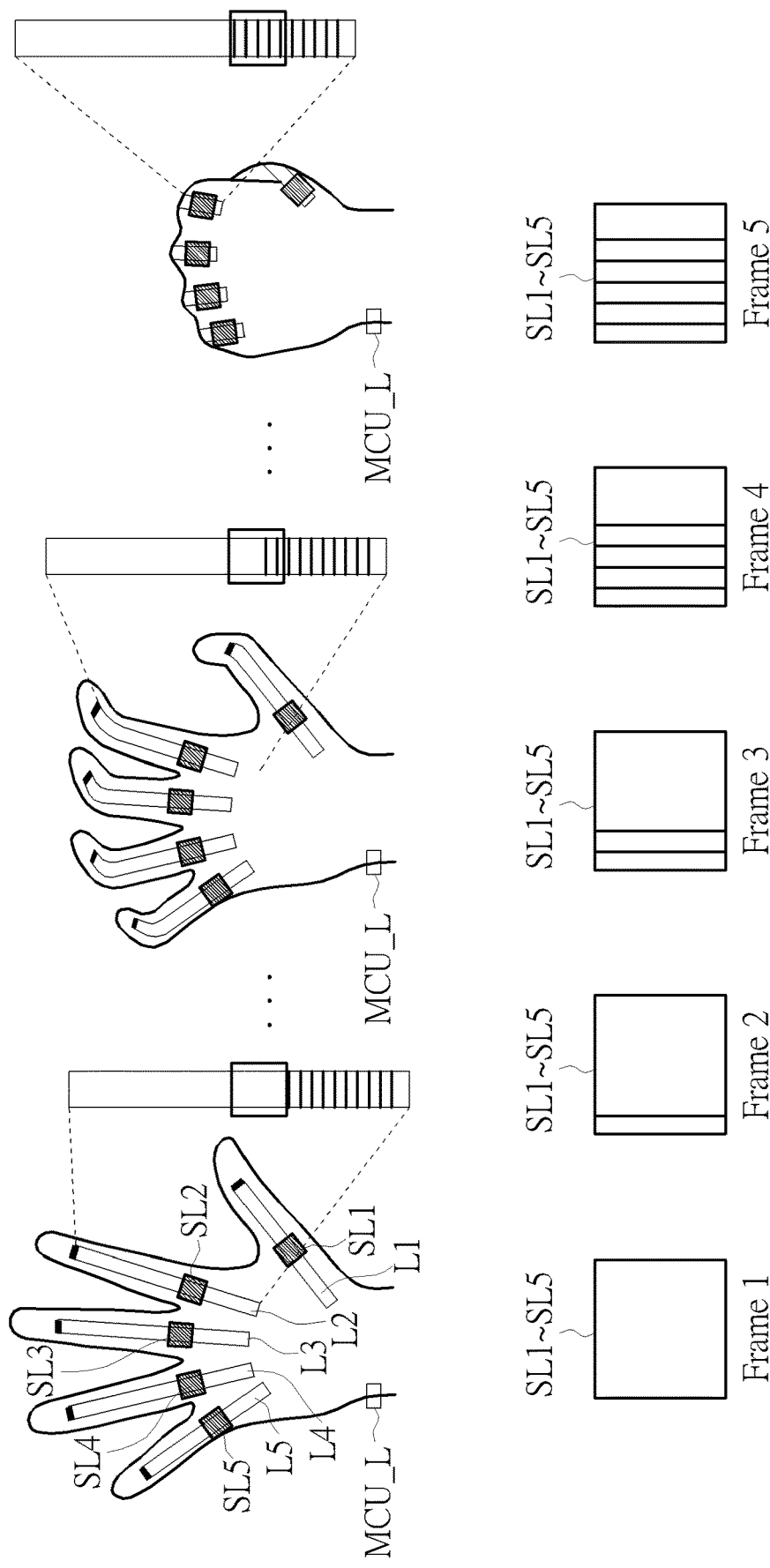
FIGS. 6 and 7 are diagrams illustrating a method of detecting the displacement of bionic tendons according to embodiments of the present invention.
Figure 7:
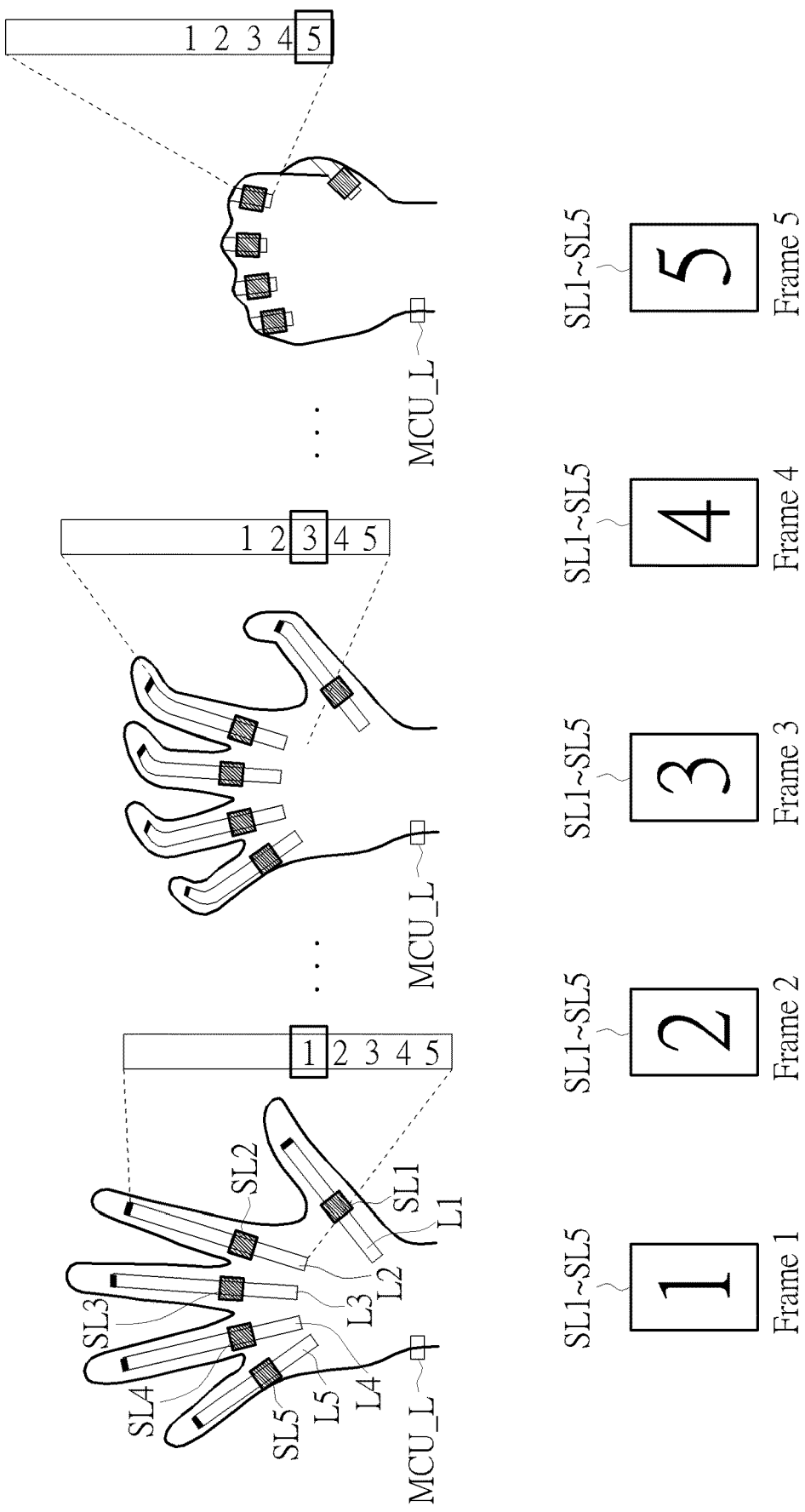
Figure 8:
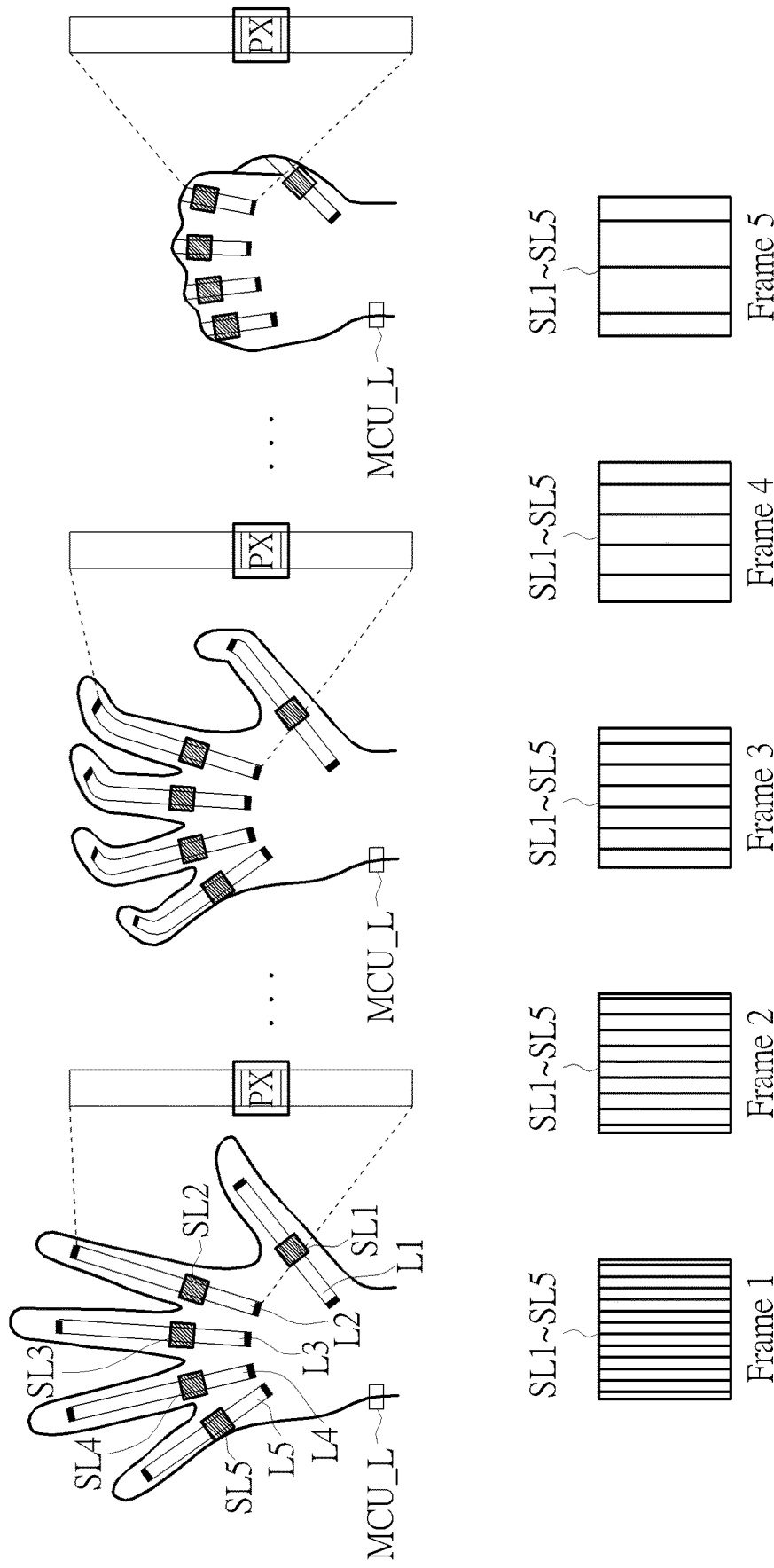
Figure 9:
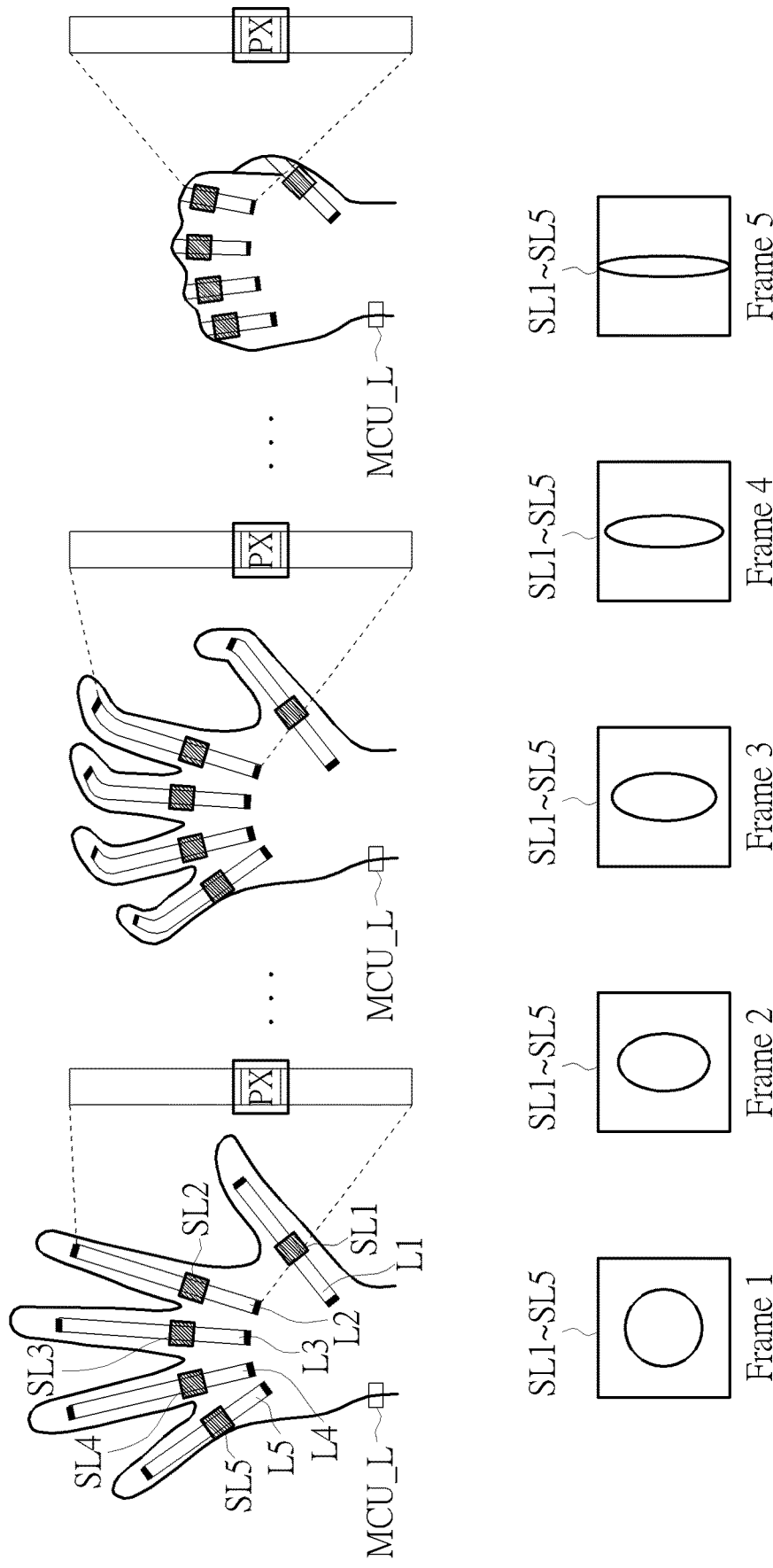

FIGS. 6 and 7 are diagrams illustrating a method of detecting the displacement of the bionic tendons according to embodiments of the present invention. FIGS. 8 and 9 are diagrams illustrating a method of detecting the deformation of the bionic tendons according to embodiments of the present invention. For illustrative purposes, the bionic tendons L1-L5 disposed in the left-hand glove 10 are depicted in FIGS. 6-9. The bionic tendons R1-R5 disposed in the right-hand glove 20 operate in the same way as the bionic tendons L1-L5 disposed in the left-hand glove 10.

In the embodiment depicted in FIG. 6, the first ends (correspond to the left-hand fingertips of the user) of the bionic tendons L1-L5 are fixed to the left-hand glove 10, while the second ends (correspond to the back of the left hand of the user) of the bionic tendons L1-L5 are disposed in the left-hand glove 10 in a movable manner. In the initial state when the left hand is flat, the bionic tendons L1-L5 include a plurality of scales on the regions between the second ends of the bionic tendons L1-L5 and the left-hand optical sensors SL1-SL5. The optical sensors SL1-SL5 are configured to detect the scales on the bionic tendons L1-L5 during each frame. The process of the user placing his left hand flat to making a first is depicted on the top side of FIG. 6, and the number of scales detected by the optical sensors SL1-SL5 are during the above-mentioned process is depicted on the bottom side of FIG. 6. In the initial state of a flat left hand, the optical sensors SL1-SL5 detect 0 scale. As the user bends his fingers and drags the second ends of the bionic tendons L1-L5 towards the fingertips, the number of scales detected by the optical sensors SL1-SL5 increase accordingly. In the state of a clenched left hand, each of the optical sensors SL1-SL5 detects 6 scales. Therefore, the displacement of each bionic tendon may be acquired according to the number of scales detected by the optical sensors SL1-SL5, thereby determining the posture of each finger (such as the bending angle).

In the embodiment depicted in FIG. 7, the first ends (correspond to the left-hand fingertips of the user) of the bionic tendons L1-L5 are fixed to the left-hand glove 10, while the second ends (correspond to the back of the left hand of the user) of the bionic tendons L1-L5 are disposed in the left-hand glove 10 in a movable manner. In the initial state of a flat left hand, the bionic tendons L1-L5 include a plurality of marks on the regions between the second ends of the bionic tendons L1-L5 and the left-hand optical sensors SL1-SL5. The optical sensors SL1-SL5 are configured to detect the marks on the bionic tendons L1-L5 during each frame. In an embodiment, the marks on the bionic tendons L1-L5 may be different numbers or symbols. FIG. 7 depicts the embodiment of numbers, but does not limit the scope of the present invention. The process of the user placing his left hand flat to making a first is depicted on the top side of FIG. 7, and the marks detected by the optical sensors SL1-SL5 are during the above-mentioned process is depicted on the bottom side of FIG. 7. In the initial state of a flat left hand, the optical sensors SL1-SL5 each detect the mark of number 1. As the user bends his fingers and drags the second ends of the bionic tendons L1-L5 towards the fingertips, the optical sensors SL1-SL5 each detect different marks. In the state of a clenched left hand, the optical sensors SL1-SL5 each detect the mark of number 5. Therefore, the displacement of each bionic tendon may be acquired according to the marks detected by the optical sensors SL1-SL5, thereby determining the posture of each finger (such as the bending angle).

In the embodiment depicted in FIG. 8, both ends of the bionic tendons L1-L5 are fixed to the left-hand glove 10. In the initial state of a flat left hand, the bionic tendons L1-L5 each include a pattern PX on the regions corresponding to the locations of the optical sensors SL1-SL5. The optical sensors SL1-SL5 are configured to detect the variation in the pitch of the patterns PX on the bionic tendons L1-L5 during each frame. In an embodiment, each pattern PX on the bionic tendons L1-L5 may be a pattern with equally-spaced vertical stripes, wherein the pitch of pattern PX may be defined by the distance between two adjacent vertical stripes. However, the type of the patterns PX does not limit the scope of the present invention. The process of the user placing his left hand flat to making a first is depicted on the top side of FIG. 8, and the patterns PX detected by the optical sensors SL1-SL5 are during the above-mentioned process is depicted on the bottom side of FIG. 8. In the initial state of a flat left hand, the optical sensors SL1-SL5 each detect the patterns PX with an initial pitch equal to 0.1 unit. As the user bends his fingers and distorts the bionic tendons L1-L5, the optical sensors SL1-SL5 each detect the patterns PX with a larger pitch. In the state of a clenched left hand, the optical sensors SL1-SL5 each detect the patterns PX with a pitch equal to 1.6 unit. Therefore, the deformation of each bionic tendon may be acquired according to the pitch of the patterns PX detected by the optical sensors SL1-SL5, thereby determining the posture of each finger (such as the bending angle).

In the embodiment depicted in FIG. 9, both ends of the bionic tendons L1-L5 are fixed to the left-hand glove 10. In the initial state of a flat left hand, the bionic tendons L1-L5 each include a pattern PX on the regions corresponding to the locations of the optical sensors SL1-SL5. The optical sensors SL1-SL5 are configured to detect the aspect ratio of the pitch PX on the bionic tendons L1-L5 during each frame. In an embodiment, each pattern PX on the bionic tendons L1-L5 is a circle pattern, wherein the aspect ratio of pattern PX may be defined by the ratio between the longest diameter and the shortest diameter of the pattern PX. However, the type of the patterns PX does not limit the scope of the present invention. The process of the user placing his left hand flat to making a first is depicted on the top side of FIG. 9, and the patterns PX detected by the optical sensors SL1-SL5 are during the above-mentioned process is depicted on the bottom side of FIG. 9. In the initial state of a flat left hand, the optical sensors SL1-SL5 each detect the patterns PX with an initial aspect ratio of 1:1. As the user bends his fingers and distorts the bionic tendons L1-L5, the optical sensors SL1-SL5 each detect the patterns PX with a different aspect ratio. In the state of a clenched left hand, the optical sensors SL1-SL5 each detect the patterns PX with an aspect ratio of 7:1. Therefore, the deformation of each bionic tendon may be acquired according to the aspect ratio of the patterns PX detected by the optical sensors SL1-SL5, thereby determining the posture of each finger (such as the bending angle).

Figure 10:
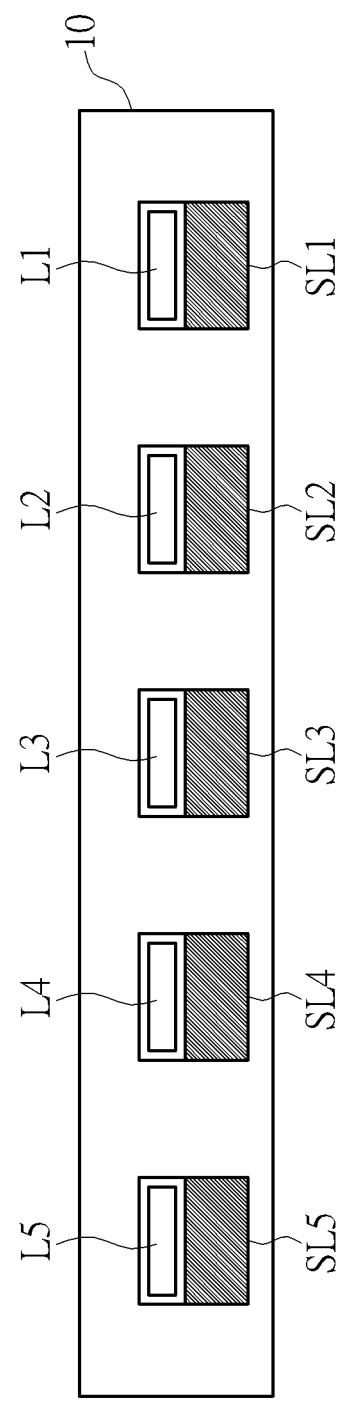
FIGS. 10 and 11 are diagrams illustrating the embodiments of bionic tendons, optical sensors and gloves according to embodiments of the present invention.
Figure 11:
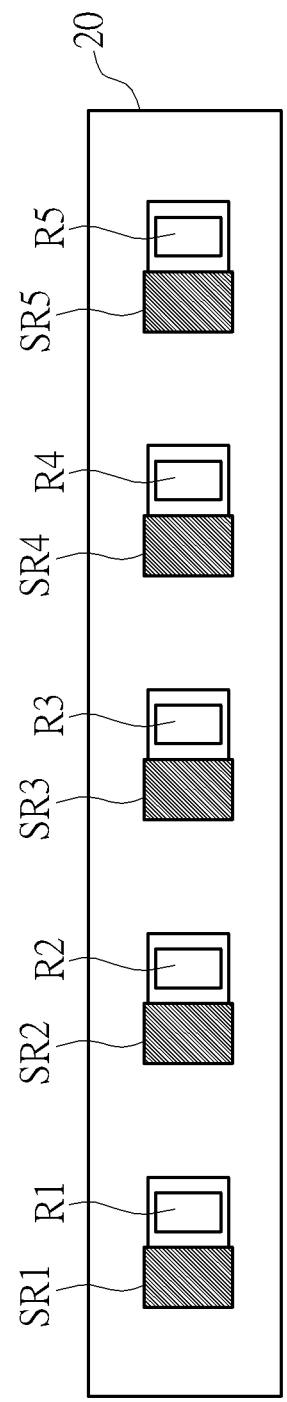

FIGS. 10 and 11 are diagrams illustrating the embodiments of the bionic tendons, the optical sensors and the gloves according to embodiments of the present invention. The left-hand glove 10 and the right-hand glove 20 may adopt elastic material or woven fabric, such as using silicone rubber. Grooves may be form inside the material of the gloves using an injection molding technique or a compression molding technique for accommodating the bionic tendons and the optical sensors. The optical sensors are fixed to the material of the gloves, while the bionic tendons are fixed to the material of the gloves only at both ends, thereby allowing displacement or deformation. FIG. 10 depicts the embodiment of the left-hand glove 10 wherein the bionic tendons L1-L5 and the optical sensors SL1-SL5 are disposed in a stacked configuration. FIG. 11 depicts the embodiment of the right-hand glove 20 wherein the bionic tendons R1-R5 and the optical sensors SR1-SR5 are disposed in a side-by-side configuration. However, the configuration of the bionic tendons and the optical sensors in the left-hand glove 10 and the right-hand glove 20 of the hand gesture sensing system 100 does not limit the scope of the present invention.

Figure 12:
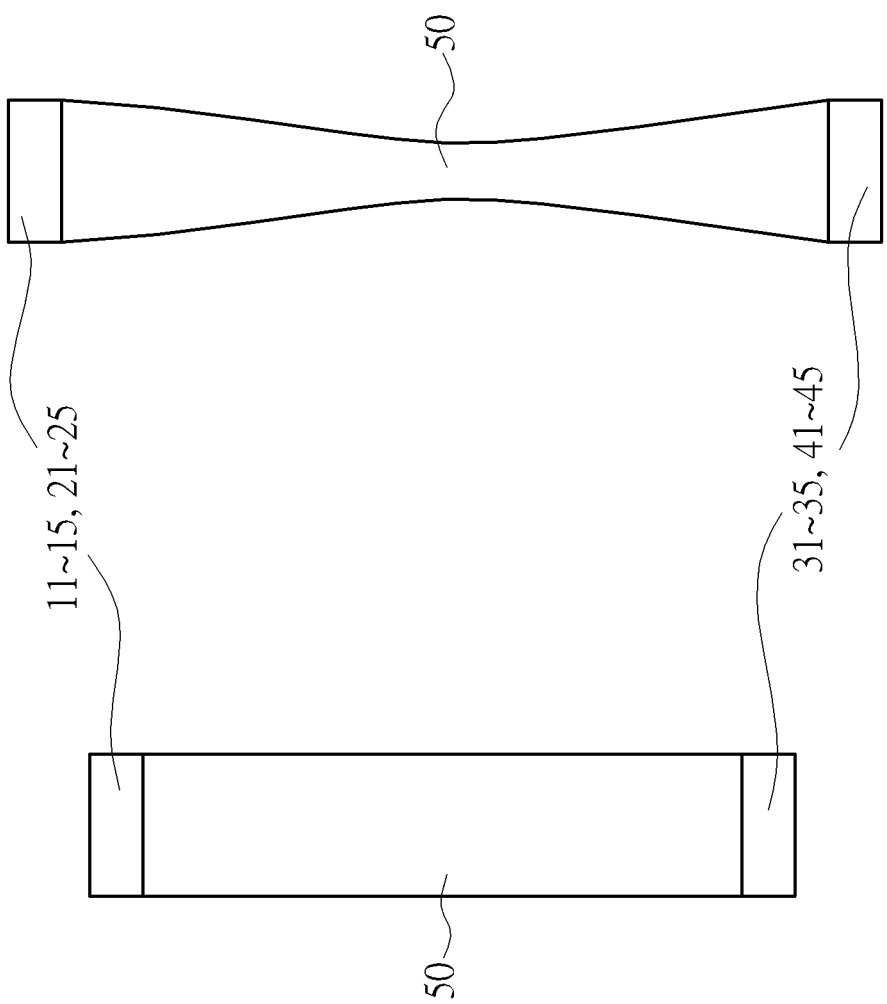
FIGS. 12 and 13 are structural diagrams illustrating the bionic tendons depicted in FIGS. 8 and 9 according to embodiments of the present invention.
Figure 13:
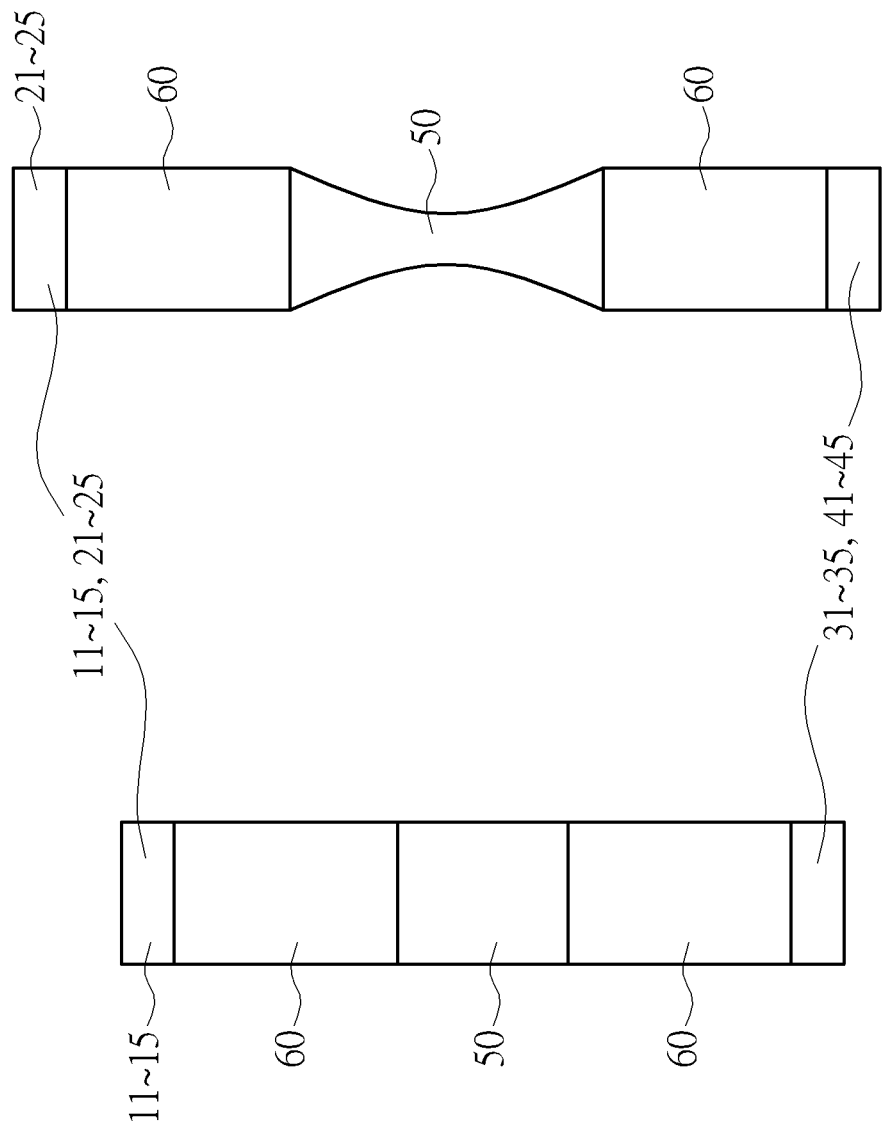

FIGS. 12 and 13 are structural diagrams illustrating the bionic tendons depicted in FIGS. 8 and 9 according to embodiments of the present invention. In the embodiment depicted in FIG. 12, each of the bionic tendons L1-L5 and R1-R5 includes a deformable region 50 (consisting of elastic material). The length of the deformable region 50 in the initial state is depicted on the left side of FIG. 12, while the length of the deformable region 50 when distorted is depicted on the right side of FIG. 12, wherein the deformation of the bionic tendons L1-L5 and R1-R5 occurs within the deformable region 50. In the embodiment depicted in FIG. 13, each of the bionic tendons L1-L5 and R1-R5 includes a deformable region 50 (consisting of elastic material) and two non-deformable regions 60 (consisting of non-elastic material), wherein the location of the deformable region 50 corresponds to the location of the corresponding optical sensor. The length of the deformable region 50 in the initial state is depicted on the left side of FIG. 13, while the length of the deformable region 50 when distorted is depicted on the right side of FIG. 13, wherein the deformation of the bionic tendons L1-L5 and R1-R5 occurs within the deformable region 50 with a smaller area, thereby improving the accuracy of the optical sensor.

In conclusion, the present invention provides a hand gesture sensing system using bionic tendons. The lightweight bionic tendons may be easily implemented inside the material of VR gloves. The displacement or deformation of the bionic tendons may accurately reflect the posture of each finger (such as the bending angle) without being influenced by sweat or other environmental factors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hand gesture sensing system using bionic tendons, comprising:
   a first glove including a first sheath, a second sheath, a third sheath, a fourth sheath, and a fifth sheath;
   a first bionic tendon disposed in the first sheath;
   a second bionic tendon disposed in the second sheath;
   a third bionic tendon disposed in the third sheath;
   a fourth bionic tendon disposed in the fourth sheath;
   a fifth bionic tendon disposed in the fifth sheath;
   a first optical sensor disposed in the first glove and configured to detect a first displacement or a first deformation of the first bionic tendon;
   a second optical sensor disposed in the first glove and configured to detect a second displacement or a second deformation of the second bionic tendon;
   a third optical sensor disposed in the first glove and configured to detect a third displacement or a third deformation of the third bionic tendon;
   a fourth optical sensor disposed in the first glove and configured to detect a fourth displacement or a fourth deformation of the fourth bionic tendon;
   a fifth optical sensor disposed in the first glove and configured to detect a fifth displacement or a fifth deformation of the fifth bionic tendon; and
   a first micro controller unit configured to identify a first hand gesture of a user when wearing the first glove according to the first through fifth displacement or according to the first through fifth deformation, wherein:
   a first end and a second end of each bionic tendon are fixed to the first glove;
   each bionic tendon includes an elastic material on a first region which corresponds to a location of each corresponding optical sensor; and
   each bionic tendon includes a non-elastic material on a second region which does not correspond to the location of each corresponding optical sensor.

2. The hand gesture sensing system of claim 1, wherein:
   a first end of the first bionic tendon, a first end of the second bionic tendon, a first end of the third bionic tendon, a first end of the fourth bionic tendon, and a first end of the fifth bionic tendon are disposed at locations of the first glove which correspond to fingertips of a user hand;
   a second end of the first bionic tendon, a second end of the second bionic tendon, a second end of the third bionic tendon, a second end of the fourth bionic tendon, and a second end of the fifth bionic tendon are disposed at locations of the first glove which correspond to a back of the user hand;
   the first optical sensor is disposed between the first end of the first bionic tendon and the second end of the first bionic tendon;
   the second optical sensor is disposed between the first end of the second bionic tendon and the second end of the second bionic tendon;
   the third optical sensor is disposed between the first end of the third bionic tendon and the second end of the third bionic tendon;
   the fourth optical sensor is disposed between the first end of the fourth bionic tendon and the second end of the fourth bionic tendon; and
   the fifth optical sensor is disposed between the first end of the fifth bionic tendon and the second end of the fifth bionic tendon.

3. The hand gesture sensing system of claim 1, wherein:
the first bionic tendon includes a first pattern on a first region corresponding to a location of the first optical sensor;
the second bionic tendon includes a second pattern on a second region corresponding to a location of the second optical sensor;
the third bionic tendon includes a third pattern on a first region corresponding to a location of the third optical sensor;
the fourth bionic tendon includes a fourth pattern on a fourth region corresponding to a location of the fourth optical sensor;
the fifth bionic tendon includes a fifth pattern on a fifth region corresponding to a location of the fifth optical sensor;
the first optical sensor is configured to detect a variation in a pitch of the first pattern for acquiring the first deformation;
the second optical sensor is configured to detect a variation in a pitch of the second pattern for acquiring the second deformation;
the third optical sensor is configured to detect a variation in a pitch of the third pattern for acquiring the third deformation;
the fourth optical sensor is configured to detect a variation in a pitch of the fourth pattern for acquiring the fourth deformation; and
the fifth optical sensor is configured to detect a variation in a pitch of the fifth pattern for acquiring the fifth deformation.

4. The hand gesture sensing system of claim 1, wherein:
the first bionic tendon includes a first pattern on a first region corresponding to a location of the first optical sensor;
the second bionic tendon includes a second pattern on a second region corresponding to a location of the second optical sensor;
the third bionic tendon includes a third pattern on a first region corresponding to a location of the third optical sensor;
the fourth bionic tendon includes a fourth pattern on a fourth region corresponding to a location of the fourth optical sensor;
the fifth bionic tendon includes a fifth pattern on a fifth region corresponding to a location of the fifth optical sensor;
the first optical sensor is configured to detect an aspect ratio of the first pattern for acquiring the first deformation;
the second optical sensor is configured to detect an aspect ratio of the second pattern for acquiring the second deformation;
the third optical sensor is configured to detect an aspect ratio of the third pattern for acquiring the third deformation;
the fourth optical sensor is configured to detect an aspect ratio of the fourth pattern for acquiring the fourth deformation; and
the fifth optical sensor is configured to detect an aspect ratio of the fifth pattern for acquiring the fifth deformation.

5. The hand gesture sensing system of claim 1, wherein each bionic tendon and each optical sensor are formed in a material of the first glove using an injection molding technique or a compression molding technique.

6. The hand gesture sensing system of claim 1, further comprising:
a second glove including a sixth sheath, a seventh sheath, an eighth sheath, a ninth sheath, and a tenth sheath;
a sixth bionic tendon disposed in the sixth sheath;
a seventh bionic tendon disposed in the seventh sheath;
an eighth bionic tendon disposed in the eighth sheath;
a ninth bionic tendon disposed in the ninth sheath;
a tenth bionic tendon disposed in the tenth sheath;
a sixth optical sensor disposed in the second glove and configured to detect a sixth displacement or a sixth deformation of the sixth bionic tendon;
a seventh optical sensor disposed in the second glove and configured to detect a seventh displacement or a seventh deformation of the seventh bionic tendon;
an eighth optical sensor disposed in the second glove and configured to detect an eighth displacement or an eighth deformation of the eighth bionic tendon;
a ninth optical sensor disposed in the second glove and configured to detect a ninth displacement or a ninth deformation of the ninth bionic tendon;
a tenth optical sensor disposed in the second glove and configured to detect a tenth displacement or a tenth deformation of the tenth bionic tendon; and
a second micro controller unit configured to identify a second hand gesture of the user when wearing the second glove according to the sixth through tenth displacement or according to the sixth through tenth deformation.

7. A hand gesture sensing system using bionic tendons, comprising:
a first glove including a first sheath, a second sheath, a third sheath, a fourth sheath, and a fifth sheath;
a first bionic tendon disposed in the first sheath;
a second bionic tendon disposed in the second sheath;
a third bionic tendon disposed in the third sheath;
a fourth bionic tendon disposed in the fourth sheath;
a fifth bionic tendon disposed in the fifth sheath;
a first optical sensor disposed in the first glove and configured to detect a first displacement or a first deformation of the first bionic tendon;
a second optical sensor disposed in the first glove and configured to detect a second displacement or a second deformation of the second bionic tendon;
a third optical sensor disposed in the first glove and configured to detect a third displacement or a third deformation of the third bionic tendon;
a fourth optical sensor disposed in the first glove and configured to detect a fourth displacement or a fourth deformation of the fourth bionic tendon;
a fifth optical sensor disposed in the first glove and configured to detect a fifth displacement or a fifth deformation of the fifth bionic tendon; and
a first micro controller unit configured to identify a first hand gesture of a user when wearing the first glove according to the first through fifth displacement or according to the first through fifth deformation, wherein:
a first end of the first bionic tendon, a first end of the second bionic tendon, a first end of the third bionic tendon, a first end of the fourth bionic tendon, and a first end of the fifth bionic tendon are fixed to the first glove;
a second end of the first bionic tendon, a second end of the second bionic tendon, a second end of the third bionic tendon, a second end of the fourth bionic tendon, and a second end of the fifth bionic tendon are disposed in the first glove in a movable manner;

the first bionic tendon includes a plurality of first scales on a first region between the second end of the first bionic tendon and the first optical sensor;

the second bionic tendon includes a plurality of second scales on a second region between the second end of the second bionic tendon and the second optical sensor;

the third bionic tendon includes a plurality of third scales on a third region between the second end of the third bionic tendon and the third optical sensor;

the fourth bionic tendon includes a plurality of fourth scales on a fourth region between the second end of the fourth bionic tendon and the fourth optical sensor;

the fifth bionic tendon includes a plurality of fifth scales on a fifth region between the second end of the fifth bionic tendon and the fifth optical sensor;

the first optical sensor is configured to detect a number of the first scales observed by the first optical sensor for acquiring the first displacement;

the second optical sensor is configured to detect a number of the second scales observed by the second optical sensor for acquiring the second displacement;

the third optical sensor is configured to detect a number of the third scales observed by the third optical sensor for acquiring the third displacement;

the fourth optical sensor is configured to detect a number of the fourth scales observed by the fourth optical sensor for acquiring the fourth displacement; and the fifth optical sensor is configured to detect a number of the fifth scales observed by the fifth optical sensor for acquiring the fifth displacement.

8. The hand gesture sensing system of claim 7, wherein each bionic tendon and each optical sensor are formed in a material of the first glove using an injection molding technique or a compression molding technique.

9. The hand gesture sensing system of claim 7, further comprising:
a second glove including a sixth sheath, a seventh sheath, an eighth sheath, a ninth sheath, and a tenth sheath;
a sixth bionic tendon disposed in the sixth sheath;
a seventh bionic tendon disposed in the seventh sheath;
an eighth bionic tendon disposed in the eighth sheath;
a ninth bionic tendon disposed in the ninth sheath;
a tenth bionic tendon disposed in the tenth sheath;
a sixth optical sensor disposed in the second glove and configured to detect a sixth displacement or a sixth deformation of the sixth bionic tendon;
a seventh optical sensor disposed in the second glove and configured to detect a seventh displacement or a seventh deformation of the seventh bionic tendon;
an eighth optical sensor disposed in the second glove and configured to detect an eighth displacement or an eighth deformation of the eighth bionic tendon;
a ninth optical sensor disposed in the second glove and configured to detect a ninth displacement or a ninth deformation of the ninth bionic tendon;
a tenth optical sensor disposed in the second glove and configured to detect a tenth displacement or a tenth deformation of the tenth bionic tendon; and
a second micro controller unit configured to identify a second hand gesture of the user when wearing the second glove according to the sixth through tenth displacement or according to the sixth through tenth deformation.

10. A hand gesture sensing system using bionic tendons, comprising:
a first glove including a first sheath, a second sheath, a third sheath, a fourth sheath, and a fifth sheath;
a first bionic tendon disposed in the first sheath;
a second bionic tendon disposed in the second sheath;
a third bionic tendon disposed in the third sheath;
a fourth bionic tendon disposed in the fourth sheath;
a fifth bionic tendon disposed in the fifth sheath;
a first optical sensor disposed in the first glove and configured to detect a first displacement or a first deformation of the first bionic tendon;
a second optical sensor disposed in the first glove and configured to detect a second displacement or a second deformation of the second bionic tendon;
a third optical sensor disposed in the first glove and configured to detect a third displacement or a third deformation of the third bionic tendon;
a fourth optical sensor disposed in the first glove and configured to detect a fourth displacement or a fourth deformation of the fourth bionic tendon;
a fifth optical sensor disposed in the first glove and configured to detect a fifth displacement or a fifth deformation of the fifth bionic tendon; and
a first micro controller unit configured to identify a first hand gesture of a user when wearing the first glove according to the first through fifth displacement or according to the first through fifth deformation, wherein:
a first end of the first bionic tendon, a first end of the second bionic tendon, a first end of the third bionic tendon, a first end of the fourth bionic tendon, and a first end of the fifth bionic tendon are fixed to the first glove;
a second end of the first bionic tendon, a second end of the second bionic tendon, a second end of the third bionic tendon, a second end of the fourth bionic tendon, and a second end of the fifth bionic tendon are disposed in the first glove in a movable manner;
the first bionic tendon includes a plurality of first marks having different patterns on a first region between the second end of the first bionic tendon and the first optical sensor;
the second bionic tendon includes a plurality of second marks having different patterns on a second region between the second end of the second bionic tendon and the second optical sensor;
the third bionic tendon includes a plurality of third marks having different patterns on a third region between the second end of the third bionic tendon and the third optical sensor;
the fourth bionic tendon includes a plurality of fourth marks having different patterns on a fourth region between the second end of the fourth bionic tendon and the fourth optical sensor;
the fifth bionic tendon includes a plurality of fifth marks having different patterns on a fifth region between the second end of the fifth bionic tendon and the fifth optical sensor;
the first optical sensor is configured to detect a type of a first mark observed by the first optical sensor for acquiring the first displacement;

the second optical sensor is configured to detect a type of a second mark observed by the second optical sensor for acquiring the second displacement;

the third optical sensor is configured to detect a type of a third mark observed by the third optical sensor for acquiring the third displacement;

the fourth optical sensor is configured to detect a type of a fourth mark observed by the fourth optical sensor for acquiring the fourth displacement; and the fifth optical sensor is configured to detect a type of a fifth mark observed by the fifth optical sensor for acquiring the fifth displacement.

11. The hand gesture sensing system of claim 10, wherein each bionic tendon and each optical sensor are formed in a material of the first glove using an injection molding technique or a compression molding technique.

12. The hand gesture sensing system of claim 10, further comprising:
a second glove including a sixth sheath, a seventh sheath, an eighth sheath, a ninth sheath, and a tenth sheath;
a sixth bionic tendon disposed in the sixth sheath;
a seventh bionic tendon disposed in the seventh sheath;
an eighth bionic tendon disposed in the eighth sheath;
a ninth bionic tendon disposed in the ninth sheath;
a tenth bionic tendon disposed in the tenth sheath;
a sixth optical sensor disposed in the second glove and configured to detect a sixth displacement or a sixth deformation of the sixth bionic tendon;
a seventh optical sensor disposed in the second glove and configured to detect a seventh displacement or a seventh deformation of the seventh bionic tendon;
an eighth optical sensor disposed in the second glove and configured to detect an eighth displacement or an eighth deformation of the eighth bionic tendon;
a ninth optical sensor disposed in the second glove and configured to detect a ninth displacement or a ninth deformation of the ninth bionic tendon;
a tenth optical sensor disposed in the second glove and configured to detect a tenth displacement or a tenth deformation of the tenth bionic tendon; and
a second micro controller unit configured to identify a second hand gesture of the user when wearing the second glove according to the sixth through tenth displacement or according to the sixth through tenth deformation.

* * * * *